UNITED STATES PATENT OFFICE.

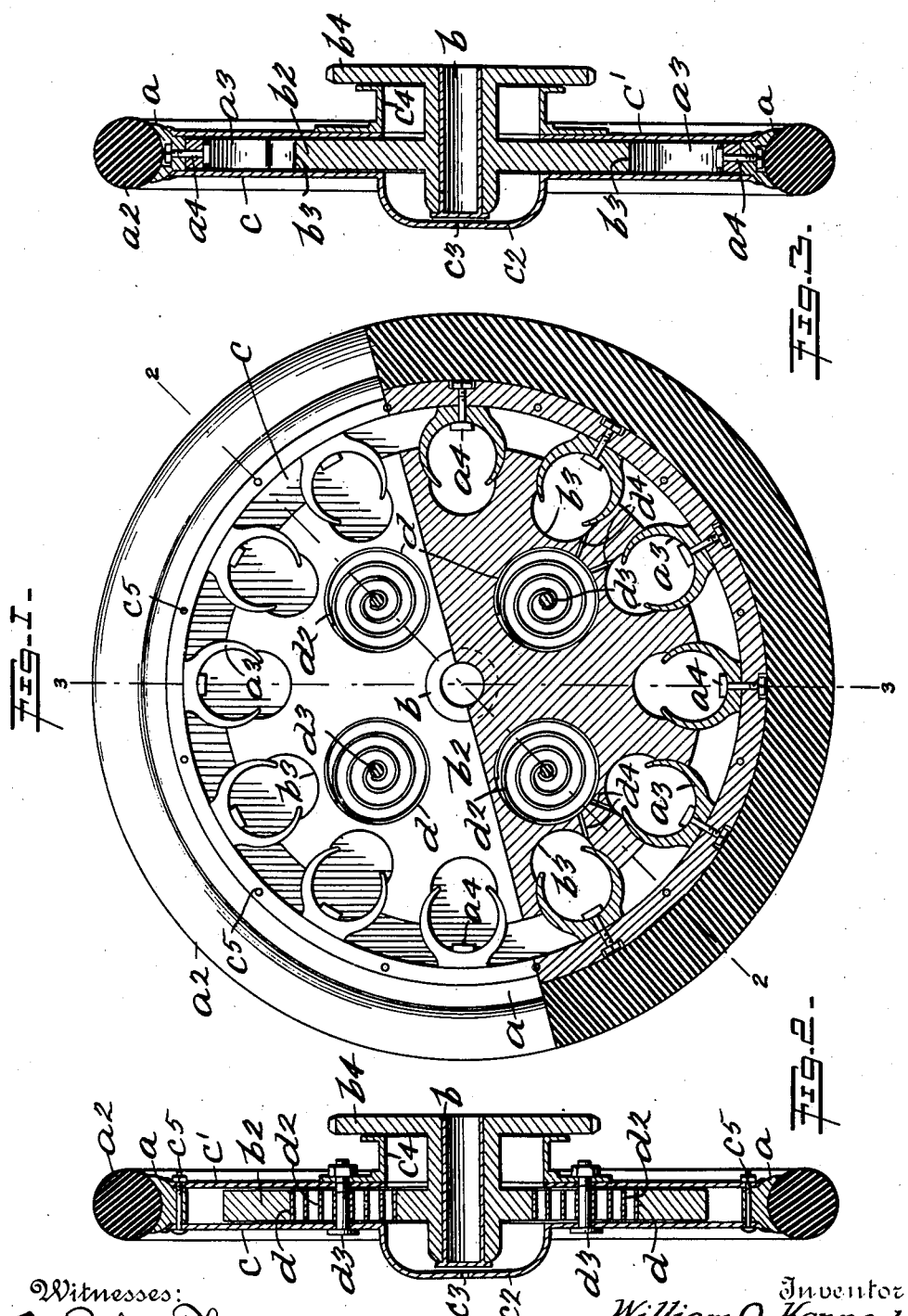

WILLIAM Q. KENNEDY, OF PATERSON, NEW JERSEY.

VEHICLE-WHEEL.

977,195.

Specification of Letters Patent. Patented Nov. 29, 1910.

Application filed January 8, 1909. Serial No. 471,239.

*To all whom it may concern:*

Be it known that I, WILLIAM Q. KENNEDY, a citizen of the United States of America, and residing at Paterson, in the county of Passaic and State of New Jersey, have invented certain new and useful Improvements in Vehicle-Wheels, of which the following is a specification, such as will enable those skilled in the art to which it appertains to make and use the same.

This invention relates to vehicle wheels, particularly for automobiles, and the object thereof is to provide a wheel having the resiliency of a pneumatic tired wheel but employing instead a solid tire, of rubber or other suitable material, and thus preventing the troubles consequent upon the use of the said pneumatic tires; a further object being to provide a wheel in which the load and impact are taken by a plurality of springs simultaneously, thus preventing the jar incidental to the movement of the load in the rotation of the wheel from one spring to another; a further object being to provide a permanently engaged connection between the wheel hub and the said springs; a still further object being to prevent a rotation of the hub independently of the tire in the starting or stopping of a vehicle provided with my wheels; a still further object being to provide incasing means for the parts of my wheel which serves as a dust guard therefor, as well as a lubricant container, and which permits the movement of the hub and connected parts in the use of the said wheels; a still further object being to provide supplemental springs, of a reduced number, which are readily detached and replaced by others of different strength in adapting the vehicles to varying loads and conditions; and a still further object being to provide a wheel of this type which is simple in construction, positive in operation, comparatively inexpensive, and which cannot readily get out of order and require repair.

My invention is fully described in the following specification, of which the accompanying drawings form a part, in which the separate parts are designated by the same reference characters in each of the views, and in which:—

Figure 1 is a side elevation of a wheel constructed according to my invention, partly in section with the covering plate removed; Fig. 2 is a section taken on the line 2—2 of Fig. 1; and Fig. 3 is a section taken on the line 3—3 of Fig. 1.

In the drawings forming a part of this application, I have shown a vehicle wheel, comprising a felly $a$, solid tire $a^2$ and hub $b$, said felly having a plurality of segmental springs $a^3$ secured to the inner side thereof by means of bolts $a^4$ or other suitable means, and said hub having a plate $b^2$ either integrally or otherwise connected therewith and provided with a recess $b^3$ adjacent each of the springs $a^3$ and which enter thereinto and are engaged thereby, and at $b^4$ I have shown a sprocket wheel connected with the hub and by means of which the wheel may be actuated.

Secured to the sides of the felly are plates $c$ and $c'$, the former of which carries a box $c^2$ provided with an oil hole $c^3$, and the latter of which carries a collar $c^4$ bearing against and adapted to slide over the sprocket $b^4$, said plates being held by means of bolts $c^5$ or suitable equivalents.

The plate $b^2$ is provided with a plurality of recesses $d$, within each of which is placed a spring $d^2$ secured to a bolt $d^3$ held in the plates $c$ and, in the use of these springs, I provide oil passages $d^4$ through the plate $b^2$, said springs $d^2$ also taking some of the load or impact and, when the conditions require it, I may remove the said springs and replace them by others of greater or less strength, thus adapting the wheel and springs $a^3$ to the said conditions without changing the latter. It will thus be seen that I provide a plurality of springs which simultaneously take the load, only one or two of them at the top not assisting in this function and there is, therefore no transferring of the entire load from one spring to another, with the consequent jar and rattle, in the rotation of the wheel, nor can the hub rotate through an arc of a circle before the felly or tire moves in starting a vehicle provided with the wheels, thus overcoming two of the fatal defects in spring spoke wheels as at present constructed.

While I have shown a certain configuration of the springs $a^3$ and the recesses therefor, it will be evident that changes therein may be made to meet varying conditions and many other changes in and modifications of the form of construction shown and described, may be made, within the scope of the following claims, without departing from the spirit of my invention, or sacrificing its advantages.

Having fully described my invention, what I claim as new, and desire to secure by Letters Patent, is:—

1. A vehicle wheel, comprising a felly, a plurality of segmental springs thereon, the ends of which are directed inwardly, a hub, and a plate connected with said hub and having peripheral recesses forming shoulders bearing upon the ends of corresponding springs, and means for preventing lateral movement of said felly with relation to said hub.

2. In a vehicle wheel, a felly, a plurality of segmental springs thereon and the ends of which are directed inwardly, a hub, and a plate secured thereto and being provided with peripheral recesses forming shoulders bearing upon the ends of corresponding springs, said recesses having the same contour as said spring ends at the points of contact therewith and means for preventing lateral movement of said felly with relation to said hub.

In testimony that I claim the foregoing as my invention I have signed my name in presence of the subscribing witnesses this 5th day of January 1909.

WILLIAM Q. KENNEDY.

Witnesses:
GEORGE F. BENTLEY,
J. C. LARSEN.